United States Patent [19]

Terui et al.

[11] Patent Number: 5,472,676
[45] Date of Patent: Dec. 5, 1995

[54] METHOD OF DEODORIZING A GAS CONTAINING MALODEROUS COMPONENTS

[75] Inventors: Sadao Terui, Hyogo; Kunio Sano, Ako; Kazuyoshi Nishikawa, Himeji; Akira Inoue, Hirakata; Yoshiyuki Yokota, Himeji, all of Japan

[73] Assignee: Nippon Shokubai Co., Ltd., Osaka, Japan

[21] Appl. No.: 933,568

[22] Filed: Aug. 24, 1992

Related U.S. Application Data

[63] Continuation of Ser. No. 522,060, May 11, 1990, abandoned.

[30] Foreign Application Priority Data

| May 11, 1989 | [JP] | Japan | 1-120052 |
| May 31, 1989 | [JP] | Japan | 1-140052 |
| Jul. 6, 1989 | [JP] | Japan | 1-175321 |
| Oct. 24, 1989 | [JP] | Japan | 1-278084 |
| Nov. 9, 1989 | [JP] | Japan | 1-292969 |
| Nov. 21, 1989 | [JP] | Japan | 1-303903 |
| Nov. 30, 1989 | [JP] | Japan | 1-312325 |

[51] Int. Cl.$^6$ .................................................. C01B 13/00
[52] U.S. Cl. .................................................. 423/219; 423/210
[58] Field of Search .................................... 423/210, 219

[56] References Cited

U.S. PATENT DOCUMENTS

| 4,092,227 | 5/1978 | Haidinger . | |
| 4,350,613 | 9/1982 | Nishino et al. | 252/455 |
| 4,477,418 | 10/1984 | Mallhaupt et al. | 423/219 |
| 4,582,677 | 4/1986 | Sugino et al. . | |
| 4,824,363 | 4/1989 | Abthoff et al. | 422/4 |
| 4,957,710 | 9/1990 | Nagai et al. | 422/171 |
| 5,080,882 | 1/1992 | Yoshimoto et al. | 423/219 |
| 5,145,657 | 9/1992 | Kobayashi et al. | 423/219 |

FOREIGN PATENT DOCUMENTS

| 881318 | 5/1980 | Belgium . | |
| 0012800 | 9/1980 | European Pat. Off. . | |
| 0257307 | 3/1988 | European Pat. Off. . | |
| 0275620 | 7/1988 | European Pat. Off. . | |
| 0290076 | 11/1988 | European Pat. Off. . | |
| 0398766A1 | 11/1990 | European Pat. Off. | 423/219 |
| 2218935 | 9/1974 | France . | |
| 2325711 | 4/1977 | France . | |
| 60647 | 5/1981 | Japan . | |
| 62-201648 | 9/1987 | Japan | 423/219 |
| 332799 | 11/1958 | Switzerland . | |
| 2067912 | 8/1981 | United Kingdom . | |
| 2210286 | 6/1989 | United Kingdom . | |

OTHER PUBLICATIONS

CAS Abstract No. CA96(4):24196b.
WPI Acc No. : 90–040739/06.

*Primary Examiner*—Benjamin R. Fuller
*Assistant Examiner*—Valerie Ann Lund
*Attorney, Agent, or Firm*—Oblon, Spivak, McClelland, Maier, & Neustadt

[57] ABSTRACT

A gas containing malodorous components is deodorized by passing the gas over a $MnO_2$ based catalyst while the catalyst is heated by directly applying an electric current thereto, thereby catalytically oxidizing the malodorous components in the gas and effecting their removal.

10 Claims, No Drawings

METHOD OF DEODORIZING A GAS CONTAINING MALODEROUS COMPONENTS

This application is a continuation of application Ser. No. 07/522,060, filed on May 11, 1990, now abandoned.

BACKGROUND OF THE INVENTION

1. Field of the Invention

The present invention concerns a catalyst that can be used in various fields including catalytic oxidation, as well as deodorization or ozone decomposition and, in particular, it relates to a catalyst capable of improving its catalytic function by applying indirect electric heating to the catalyst itself thereby elevating the catalyst temperature. The present invention also relates to a useful method of using such a catalyst.

2. Description of the Prior Art

When a catalyst, e.g., for catalytic oxidation is used, the catalyst is heated generally in view of the reaction temperature. However, heating of the catalyst requires an additional installation of a heating source such as a gas burner or an electric heater. This is not only economically disadvantageous in view of the installation cost but also results in a drawback in view of a heat efficiency since heating by the heating source is usually applied by indirect heating. Further, since a space for the heating source has to be secured, no compact structure can be attained. In addition, indirect heating of the catalyst as described above leads to the loss of heat energy, as well as it inevitably brings about unevenness in the heating.

On the other hand, a catalyst for ozone decomposition or a catalyst for ozone deodorization is usually operated at a normal temperature without heating but the catalytic function can not fully be utilized sometimes depending on the working conditions. For instance, the catalyst activity can not fully be attained due to the effect of moisture if an object to be treated is a gas at high humidity. It is considered that the active sites at the surface of the catalyst are covered with moisture to reduce the chance of contact between the gas to be treated and the catalyst. Accordingly, it is difficult to maintain the catalyst set to a reaction device at a high catalytic activity for a long period of time in such a case. For avoiding such a disadvantage, there may be considered to pass a gas at high humidity into the reaction device after previously heating the gas, but this requires installation of an additional heating source to bring about a problem similar to that in the catalyst used for catalytic oxidation.

OBJECT OF INVENTION

The present invention has been accomplished in view of the foregoing situations and an object thereof is to provide a catalyst which can be heated easily in a state of use, can provide the catalytic activity effectively and stably for a long period of time in such a way of use, and does not suffer from any particular disadvantage in view of cost and space, irrespective of that the catalyst is used under heating.

Another object of the present invention is to provide a useful method of using the catalyst described above in various application fields such as catalytic oxidation, deodorization and ozone decomposition.

SUMMARY OF THE INVENTION

The foregoing objects can be attained by a catalyst in accordance with the present invention prepared by integrally forming manganese dioxide ($MnO_2$) having a catalytic activity per se and can by directly heated be electric current supply by utilizing the electroconductivity of $MnO_2$ (hereinafter referred to as a catalyst I).

In the catalyst according to the present invention, it is also effective to use, in addition $MnO_2$, those ingredients containing one or more of elements selected from the group consisting of Fe, Co, Ni, Cu, Ag, Au, Pt, Pd and Rh, by which the catalytic function of the catalyst can be improved further (hereinafter referred to as a catalyst II).

Further, it is also effective to integrally form each of the above-mentioned catalysts I and II being supported on an inorganic support, by which the moldability upon preparation can be made more excellent (hereinafter referred to as catalysts III and IV respectively).

The catalysts III and IV use inorganic supports selected from at least one of Ti—Si binary composite oxide, Ti—Zr binary composite oxide and Ti—Si—Zr ternary composite oxide (hereinafter referred to as catalysts V, V' respectively).

According to the study of the present inventors, the object of the present invention can be attained also by a catalyst which comprises the following ingredients (a)–(c) and which can be directly heated by electric current supply (hereinafter referred to as a catalyst VI):

(a) a catalyst ingredient comprising one or more of elements selected from the group consisting of Ti, Si, Al, Mg and Zr, (b) a catalyst ingredient comprising one or more of elements selected from the group consisting of Mn, Fe, Co, Ni, Ag, Au, Pt, Pd and Rh, (c) one or more of conductors selected from the group consisting of metal powder, metal fiber, graphite and activated carbon.

As the catalyst ingredient (a) used for the catalyst VI, at least one of a binary composite oxide comprising Ti and Si, a binary composite oxide comprising Ti and Zr or a ternary composite oxide comprising Ti, Si and Zr is used particularly preferably (hereinafter referred to as a catalyst VII).

All of the catalyst I–VII have excellent deodorizing function and effective deodorizing method can be attained by using them. As the deodorizing method, it is proposed such a constitution of introduction a gas containing malodor components to a catalyst while directly heating the catalyst by electric current supply and then removing the malodor components by catalytic oxidation. The heating temperature in this case is preferably set to 100°–400° C. It is not always necessary that the direct heating by electric current supply is conducted continuously but it may be heated intermittently.

By the way, there has also been known a deodorizing method of introducing malodor components contained in a gas into ozone and then removing them by catalytic oxidizing decomposition under the presence of a catalyst, and each of the catalysts I–VII (V' is also incorporated here and hereinafter) according to the present invention can also be used as such a ozone deodorizing catalyst. As the deodorizing method, it is proposed such a constitution of using each of the catalysts I–VII and conducting deodorization while regenerating the catalyst by directly heating under electric current supply. The heating temperature is preferably about from 100° to 400° C. like that in the deodorizing method described previously.

On the other hand, the catalysts I–VII according to the present invention can also be used as the ozone decomposing catalyst and ozone can effectively be decomposed catalytically by introducing an ozone-containing gas to the catalyst I–VII while directly heating the catalyst by electric current supply. The heating temperature is preferably about from 50° to 400° C.

Further, the catalyst I–VII according to the present invention can also be applied to a method of treating a gas containing components to be adsorbed. For such a method, it is proposed an adsorption-burning decomposition method for treating a gas containing components to be adsorbed which comprises using the catalyst I–VII, disposing a catalyst, an adsorbent and a catalyst in this order from the upstream in the flowing direction of the gas, and alternately repeating a step of introducing the gas containing components to be adsorbed into the adsorbent thereby adsorbing the components to be adsorbed to the adsorbent or the adsorbent and the catalyst and a step of elevating the temperature of the adsorbent and the catalyst and applying a catalytic effect to the components to be adsorbed which are desorbed from the adsorbent.

In particular, the catalyst III–VII (including V') also has an adsorbing function, and an adsorption-burning decomposition method as described below can be proposed by utilizing this property. That is, a method of using the catalyst according to the present invention is an adsorption-burning decomposition method of adsorbing components to be adsorbed to a catalyst having an adsorbing function, desorbing the adsorbed components by heating and burning to decomposition them under the catalytic effect, wherein the catalyst III–VII is disposed such that the flowing direction of the gas is vertical relative thereto, the gas containing components to be adsorbed is introduced from below to said catalyst by means of a blower when adsorbing step is conducted for the components to be adsorbed, while the temperature of the catalyst is elevated and the operation of the blower is stopped or the blowing is reduced by decreasing the number of rotation for the blower when the components to be adsorbed are desorbed and decomposed by burning, thereby preventing the unburnt components to be adsorbed from being released to the outside.

DESCRIPTION OF INVENTION

The present inventors have made a study from various approaches in view of developing a catalyst that can be used efficiently for a long period of time. As a result, it has been found that a catalyst prepared by integrally molding $MnO_2$ can provide a stable catalytic treating effect for a long period of time with no requirement for disposing an additional heating source and have achieved the catalyst I according to the present invention.

The present inventors have further made a study for improving the catalytic function of the catalyst I. As a result, it has been found that more excellent catalytic function can be provided by incorporating, in addition to $MnO_2$, one or more of catalytic ingredients selected from the group consisting of Fe, Co, Ni, Cu, Ag, Au, Pt, Pd and Rh (catalyst II).

When $MnO_2$ is integrally molded into a catalyst, since molding is difficult with $MnO_2$ alone or a mixture of $MnO_2$ and other catalyst ingredient alone, a binder such as a silica sol or alumina sol or other molding aids may usually be used.

Further, it has also been found that the moldability upon molding is further improved by integrally molding $MnO_2$ or $MnO_2$ and the catalyst ingredient as described above while being carried on an inorganic support (catalyst III, IV).

While most of metal oxides are non-electroconductive material, $MnO_2$ is conductive having a specific resistivity of about 0.1 ohm.cm. In addition, $MnO_2$ is useful as a catalyst having a function of promoting chemical reactions such as catalytic oxidation or ozone decomposition.

In the catalyst described above, $MnO_2$ or $MnO_2$ and other catalyst ingredients are integrally molded and used as the catalyst while taking notice on the electroconductive property of $MnO_2$ and with an aim of providing excellent catalytic function.

Since the catalyst I–IV according to the present invention does not use carbon or graphite as an electroconductive material, it is free from ignition danger and has a merit of excellent ozone resistance. In addition, the present invention provides, in addition to $MnO_2$ alone, a catalyst blended with the catalyst ingredients as described above and such a catalyst can improve the catalytic function remarkably as compared with that of $MnO_2$ alone.

The inorganic compound usable as the inorganic support in the present invention includes usual compounds such as alumina, silica, silica-alumina, titania, zirconia, zeolite, diatomaceous earth and magnesium silicate, which may be used optionally alone or as a mixture of two or more of them to make the moldability upon preparation satisfactory. In particular, a binary composite oxide comprising Ti and Si, a binary composite oxide comprising Ti and Zr and a ternary composite oxide comprising Ti, Si and Zr are preferred. That is, these composite oxides have satisfactory moldability and excellent function as a support, as well as they are excellent in (1) adsorbing performance, (2) sulfur resistance, (3) ozone decomposing function, etc. and can provide the catalyst with such performances (catalyst V, V').

The composition ratio for the $MnO_2$ (A), the catalyst ingredient (B) and the inorganic support (C) can be determined depending on the desired electroconductivity and the catalytic function with no particular restrictions. From a practical point of view, it is about from 25 to 60% by weight for (A), from 0 to 60% by weight, as oxide, in the case of Co, Ni, Cu and Ag and from 0 to 10% by weight, as metal element, in the case of Au, Pt, Pd and Rh for (B) and from 40 to 75% by weight of (C).

The present inventors have also studied for the catalyst capable of satisfying the foregoing purposes also from another point of view. As a result, it has been found that a catalyst comprising the following ingredients (a)–(c) (hereinafter referred to as the catalyst VI) can also attain the same purpose as that in the catalyst I–V, V':

(a) a catalyst ingredient comprising one or more of elements selected from the group consisting of Ti, Si, Al, Mg and Zr, (b) a catalyst ingredient comprising one or more of elements selected from the group consisting of Mn, Fe, Co, Ni, Ag, Au, Pt, Pd and Rh, and (c) one or more of electroconductive materials selected from the group consisting of metal powder, metal fiber, graphite and activated carbon.

The specific resistivity of the catalyst VI according to the present invention is, preferably, from 0.1 to 1000 ohm.cm. If the specific resistivity is less than 0.1 ohm.cm, it is not preferred since a great current is caused to require a large diameter of lead wires and bring about a large energy loss and not preferred also from a safety point of view. On the other hand, if the specific resistivity exceeds 1000 ohm.cm, less electric current flows to necessitate high voltage thereby bringing about a problem in view of the insulation and also causes a problem from a safety point of view.

For the catalyst ingredient (a) used in the present invention, one or more of elements of Ti, Si, Al, Mg and Zr may be used appropriately in combination, but it is particularly preferred to use at least one of the binary composite oxide comprising Ti and Si, a binary composite oxide comprising Ti and Zr and a ternary composite oxide comprising Ti, Si and Zr in view of the catalytic activity and adsorbing performance.

While on the other hand, for the catalyst ingredient (b), one or more of elements selected from the group consisting of Mn, Fe, Co, Ni, Ag, Au, Pt, Pd and Rh may be used appropriately in combination.

The metal powder or the metal fiber used as the electroconductive material may be prepared by a known method from electroconductive metal such as Al, Ag or Cu.

The catalyst I–VII according to the present invention has to be molded integrally since direct heating by electric current supply is necessary but there is no particular restriction to the shape. However, in view of the catalytic efficiency between the material and catalyst, pressure loss, etc., a honeycomb shape is optimum having a geometrical surface area which is increased relative to the space for disposition the catalyst.

As a specific means for the direct heating of the catalyst by electric current supply, there can be mentioned, typically, such a constitution of coating an electroconductive paste (for instance, silver paste) on both sides of the catalyst, bonding a metal plate to each of the coated sides and then connecting a lead wire to the metal plate for electric current supply.

When the catalyst according to the present invention is used, the time for direct heating by electric current supply may be determined depending on the situation of use and it is heated continuously or intermittently in accordance with the situation. For instance, in a case of using the catalyst for the catalytic oxidation, the catalyst is continuously heated by electric current supply. In a case of using under a normal temperature and at high humidity, it is possible to conduct repeating procedures of using the catalyst at a normal temperature without heating for a period in which the activity is not reduced, applying heating by electric current thereby evaporating to remove moisture adsorbed on the surface of the catalyst at a time when the activity is reduced by the adsorbed moisture and then interrupting the heating by electric current supply at the instance when the regeneration of the catalyst is completed and thereafter using it under the normal temperature again.

The method of controlling the temperature upon heating by electric current supply for the catalyst may properly be determined depending on the purpose of use for the catalyst. There can be mentioned a method, for example, of heating by electric current supply while setting the voltage or current constant without using a temperature sensor, or a method of acurately controlling the range for the heating temperature by applying ON-OFF control by a temperature sensor, etc. However, since the resistance value of the catalyst is lowered as the temperature is elevated, it is necessary, upon temperature control, that the current supply conditions for voltage, current, etc. have to be set with reference to the resistance value at the working temperature.

When the catalyst according to the present invention is integrally molded, the molding is difficult if $MnO_2$ is used alone (catalyst I) but it can be molded easily by using a heat resistant inorganic binder. As such an inorganic binder, there can be mentioned, for example, alumina sol or silica sol.

As a method of preparing a catalyst in which the catalyst ingredients described above added to $MnO_2$, there can be mentioned the following method.

(1) A method of adding an inorganic binder such as an alumina sol or silica sol and a molding aid to a powder of $MnO_2$, mixing and kneading them while adding an appropriate amount of water, molding them into a honeycomb-like shape by an extrusion molding machine, drying and sintering the molding product to obtain a $MnO_2$ molding product, which is then impregnated with an aqueous solution of a metal salt as the catalyst ingredient described above, supporting the catalyst ingredient thereon and then drying and calcining them.

(2) A method of adding an aqueous solution of the metal salt of the catalyst ingredient or the oxide of the catalyst ingredient together with a molding aid to a powder of $MnO_2$ and then kneading and molding them.

Further, for the preparation of the catalyst III, IV according to the present invention by using the inorganic support, there can be mentioned the following methods:

(A) A method of adding a molding aid to a powder of an inorganic support, mixing and kneading them while adding an appropriate amount of water, molding them into a honeycomb shape by an extrusion molding machine, drying and calcining them to obtain an inorganic support molding product, impregnating the molding product with an aqueous solution of manganese nitrate and then drying and calcining them to support $MnO_2$ thereon, or further impregnating an aqueous solution of the metal salt as the catalyst ingredient thereby supporting the catalyst ingredient and then drying and calcining them.

(B) A method of adding an aqueous solution of manganese nitrate or a powder of $MnO_2$ to a powder of an inorganic support and then kneading and molding them, or further impregnating the molding product with an aqueous solution of a metal salt for support and then drying and calcining them.

(C) A method of adding an aqueous solution of a metal salt or the oxide of the catalyst ingredient together with a molding aid to a powder mixture of $MnO_2$ and a powder of an inorganic support and then kneading and molding them.

In the deodorizing method according to the present invention, a gas containing malodor components is introduced alone or together with ozone into catalyst I–VII while heating the catalyst directly by electric current supply thereby catalytically decomposing the malodor components, in which the temperature for the heating is set preferably to 100°–400° C. If the temperature is lower than 100° C., decomposing function at high efficiency can not be provided and, on the other hand, if it exceeds 400° C., the running cost increases and there is a problem for the durability of the catalyst.

In the ozone decomposition method according to the present invention, catalytic decomposition is conducted by the catalyst, in which the heating temperature is set preferably to 50°–400° C. If the temperature is lower than 50° C., decomposing effect at high efficiency can not be provided and, on the other hand, if it exceeds 400° C., the running cost increased and there is a problem for the durability catalyst.

By the way, as a method of removing various components contained in gases (for example, malodor components, triethylamine, methylmercaptan, etc.), adsorption-burning decomposition method by catalyst is known. In the method, steps of absorbing the components onto an adsorbing catalyst and then heating them to desorb the components and removing them by burning are repeated. Since it has merits that the constitution of the device is relatively simple, regeneration of the adsorbing catalyst and the burning removal can be conducted in parallel and, in addition, the components to be adsorbed can be decomposed efficiently in a condensated state, it has been generally practiced in various fields. However, the adsorption-burning decomposition method has been conducted somewhat at random and it can not always be said that optimum operation conditions have been found. Accordingly, the inherent merit of the method can not sometime be attained fully depending on the conditions.

Under such situations, the present inventors have made a study from various approaches with a view point of effectively utilizing the feature of the catalyst I–VII, intending for developing an adsorption burning decomposition method capable of operating efficiently for a long period of time and providing the merit thereof sufficiently. As a result, it has been accomplished an adsorption-burning decomposition method according to the present invention based on the finding that components to be adsorbed can be put to burning decomposition efficiently for a long period of time by using the catalyst I–VII, and by adopting such a constitution as disposing a catalyst, an adsorbent and a catalyst in this order from the upstream in the flowing direction of a gas and carrying out operation while skillfully combining an adsorption step by the adsorbent and a burning decomposition step by the catalyst, by which respective merits for both of them can be obtained to the maximum extent and regeneration for the adsorbent can be conducted optionally.

For practicing the adsorption-burning decomposition method described above, a gas containing components to be adsorbed is introduced into the adsorbent to adsorb the components thereon and a cleaned gas after removal of the components to be adsorbed is allowed to pass. Then, the adsorbent and the catalyst are heated before the adsorbent is saturated, the components to be adsorbed are desorbed from the adsorbent and introduced to the catalyst, thereby subjecting the adsorbed components to the catalytic action and to the burning decomposition. When all the components to be adsorbed are desorbed and entirely decomposed through burning by the catalyst, heating is interrupted and the process is returned to the adsorbing step. The purpose of the present invention can be attained by repeating the steps.

There is no particular restriction for the heating means in the above method. The adsorbent and the catalyst may be heated simultaneously or the adsorbent and the catalyst may be closely laminated in which only the catalyst is heated directly by electric current supply and the heat is conducted to the adsorbent. In any of the cases, the temperature for both of the catalyst and the adsorbent have to be elevated together.

In the present invention, a gas containing the components to be adsorbed may be introduced (blowing) always through the entire period for each of the steps or may be introduced only during the adsorption step and interrupted during heating (burning step). In the former process, since the adsorbed components desorbed from the adsorbent are mixed into a flowing gas, the concentration of the adsorbed components in the flowing gas is diluted. Accordingly, it is desirable to somewhat reduce the amount of the gas containing the adsorbed components. On the other hand, in the case of using the latter means, since it may be considered that the adsorbed components may be diffused to the upstream in the flowing direction of the gas when desorbed from the adsorbent, the constitution of the present invention, in which the catalyst is disposed also to the upstream in the flowing direction of the gas in the adsorbent, can conduct burning decomposition also by the catalyst on the upstream, which is particularly effective.

There is no particular restriction for the adsorbent used in the above method and there can be mentioned, for example, zeolite, alumina, silica-alumina and flame retardant activated carbon. Further, there is no particular restriction also to the shape of the adsorbent and, for example, any of shapes such as honeycomb, pellet, etc. may be used.

Among the catalyst I–VII according to the present invention, the catalyst III–VII are particularly excellent in view of the adsorbing effect as well as the catalytic effect. In view of the above, the present inventors have made a study from an aspect different from that in the method described above, for developing an adsorption-burning decomposition method capable of effective operation for a long period of time by utilizing the foregoing features and capable of fully developing such features. As a result, it has been found that the foregoing object can be attained by disposing a catalyst III–VII such that a gas flows in the vertical direction relative thereto, and adopting such constitution as introducing a gas containing adsorbed components from below to the adsorbing catalyst by means of a blower, and adsorbing the adsorbed components, heating the catalyst upon burning decomposition while interrupting the operation of the blower and conducting burning decomposition for the adsorbed components in the course where the adsorbed components are desorbed and uprise spontaneously by temperature elevation.

In this method, it is necessary to introduce the gas containing the adsorbed components from below relative to the adsorbing catalyst, so that once adsorbed components are prevented from being desorbed during temperature elevation step and upwardly releasing in an unburnt state. That is, if the gas containing adsorbed components is introduced from above the catalyst, the adsorbed components are so adsorbed that the adsorbing concentration is gradually reduced from above to below of the catalyst. In such a state, most of the components desorbed during temperature elevation step of the catalyst escape upwardly due to spontaneous uprising by the temperature elevation before they subjected to catalytic effect. On the contrary, if the gas containing adsorbed components is introduced from below the catalyst as in this method, the adsorbed components are adsorbed such that the concentration of the adsorption is gradually decreased from below to the above of the catalyst. In such a state, the catalyst and the adsorbed components have a sufficient chance of contact before the adsorbed components uprise spontaneously and are discharged from above the catalyst during temperature elevation step of the catalyst, thereby enabling, as much as possible, to avoid that the adsorbed components are discharged externally while being unburnt.

Further in this method, it is necessary to interrupt the operation of the blower or reducing the number of rotation of the blower to reduce the stream of the blower during burning decomposition, for preventing the rapid uprising release of the desorbed components by usual operation of the blower thereby sufficiently conducting the reaction of the burning decomposition. That is, in a constitution that the blower is put to usual rotation also during burning decomposition, if the gas is adapted to be introduced from below and the concentration slope for the adsorption is formed as described above, the components desorbed are rapidly released and no sufficient time of contact required for receiving the sufficient catalytic decomposition can be ensured.

The present invention will be described more specifically referring to examples but the present invention is not limited only to the examples and any modification and improvement within the gist of the present invention is encompassed within a technical scope of the present invention.

EXAMPLE

Example 1

After adding 0.5 kg of silica-sol (30% by weight $SiO_2$ content) was added to 10 kg of $\beta$-$MnO_2$ and mixing them thoroughly in a kneader with an appropriate amount of water, the mixture was sufficiently kneaded in a kneader and the uniform kneading product was extrusion molded to prepare a lattice-like honeycomb product having an outer shape of 50 mm height, 50 mm width and 50 mm length (0.3 mm thickness, 1.4 mm opening), which was dried at 150° C. for 5 hours and then calcined at 300° C. for 2 hours in an air atmosphere to prepare a catalyst according to the present invention. The resultant catalyst had a specific resistivity of 1.2 ohm.cm.

CO oxidizing function of the thus prepared catalyst was examined as described below.

125 cc of the lattice-like honeycomb catalyst described above was charged into a tubular reactor made of SUS and air containing 1% CO at a normal temperature was introduced to the catalyst at a flow rate of 1.25 $Nm^2/hr$ (space velocity at 10000 $hr^{-1}$). In this case, voltage was controlled such that the catalyst temperature was 300° C. and the CO oxidation removal rate was determined to be 87%. The oxidation removal rate was calculated by the following equation:

$$\text{CO oxidation removal rate (\%)} = \left(1 - \frac{\text{CO concentration at discharge side}}{\text{CO concentration at introduction side}}\right) \times 100$$

Example 2

A lattice-like honeycomb catalyst was prepared in the same manner as in Example 1 except for using an alumina sol (30% by weight of $Al_2O_3$ content) instead of the silica sol.

The resultant catalyst had a specific resistivity of 1.5 ohm.cm.

When the CO oxidation function of the thus prepared catalyst was examined in the same manner as in Example 1, the CO oxidation removal rate showed high value of 89%.

Example 3

Styrene oxidation function was examined under the following conditions by using the catalyst prepared in Example 1

125 cc of the lattice-like honeycomb catalyst obtained in Example 1 was charged in a tubular reactor made of SUS and air containing 1000 ppm of styrene at a normal temperature was introduced into the catalyst at a flow rate of 1.25 $Nm^3/hr$ (space velocity at 10,000 $hr^{-1}$). When voltage was controlled such that the catalyst temperature was 300° C. and the styrene oxidation removal rate was determined, it was 80%.

Example 4

Trimethylamine oxidation function was examined under the following conditions by using the catalyst prepared in Example 1.

125 cc of the lattice-like honeycomb catalyst obtained in Example 1 was charged in a tubular reactor made of SUS and air containing 50 ppm of triethylamine at a normal temperature was introduced into the catalyst at a flow rate of 1.25 $Nm^3/hr$ (space velocity at 10,000 $hr^{-1}$). When voltage was controlled such that the catalyst temperature was 340° C. and the trimethylamine oxidation removal rate was determined, it was 71%.

Example 5

Ozone decomposition function was examined under the following conditions by using the catalyst prepared in Example 1.

125 cc of the lattice-like honeycomb catalyst obtained in Example 1 was charged in a tubular reactor made of SUS and a steam-saturated air containing 5000 ppm of ozone at a normal temperature was introduced into the catalyst at a flow rate of 1.25 $Nm^3/hr$ (space velocity at 10,000 $hr^{-1}$). When voltage was controlled such that the catalyst temperature was 100° C. and the ozone decomposition rate after 100 hours was determined, 100% ozone was decomposed. The ozone decomposition rate was determined by the following equation.

$$\text{Ozone decomposition rate (\%)} = \left(1 - \frac{\text{ozone concentration at discharge side}}{\text{ozone concentration at introduction side}}\right) \times 100$$

Example 6

The catalyst obtained in Example 1 was further impregnated with an aqueous solution of platinum nitrate, dried and then calcined to prepare a catalyst containing platinum as the catalyst ingredient. The resultant catalyst contained 2 g of Pt per one liter of the catalyst and had a specific resistivity of 1.3 ohm.cm.

The CO oxidation function of the prepared catalyst was examined as described below.

125 cc of the lattice-like honeycomb catalyst obtained in Example 1 was charged in a tubular reactor made of SUS and air containing 1% of CO at a normal temperature was introduced into the catalyst at a flow rate of 3.75 $Nm^3/hr$ (space velocity at 30,000 $hr^{-1}$). When voltage was controlled such that the catalyst temperature was 210° C. and the CO oxidation removal rate was determined in accordance with the equation shown in Example 1, the CO oxidation removal rate was more than 99%.

Example 7

A lattice-like honeycomb catalyst was prepared in the same means as in Example 6 except for using an aqueous solution of palladium nitrate instead of the aqueous solution of platinum nitrate. The resultant catalyst contained 2 g of Pd per one liter of the catalyst and has a specific resistivity of 1.5 ohm.cm.

When the CO oxidation function of the prepared catalyst was examined in the same manner as in Example 1, the CO oxidation removal rate showed a high value of more than 99%.

Example 8

A lattice-like honeycomb catalyst was prepared in the same means as in Example 6 except for using a mixed aqueous solution of copper nitrate and iron nitrate instead of the aqueous solution of platinum nitrate. The resultant catalyst contained 15 g of Cu and 10 g of $Fe_2O_3$ per one liter of the catalyst and had a specific resistivity of 2 ohm.cm.

When the CO oxidation function of the prepared catalyst was examined in the same manner as in Example 1, the CO oxidation removal rate was 95%.

Example 9

Styrene oxidation function was examined under the following conditions by using the catalyst prepared in Example 6.

125 cc of the lattice-like honeycomb catalyst obtained in Example 6 was charged in a tubular reactor made of SUS and air containing 1000 ppm of styrene at a normal temperature was introduced into the catalyst at a flow rate of 2.5 $Nm^3/hr$ (space velocity at 20,000 $hr^{-1}$). When voltage was controlled such that the catalyst temperature was 200° C. and the styrene oxidation removal rate was determined, it was 93%.

Example 10

Trimethylamine oxidation function was examined under the following conditions by using the catalyst prepared in Example 6.

125 cc of the lattice-like honeycomb catalyst obtained in Example 6 was charged in a tubular reactor made of SUS and air containing 50 ppm of triethylamine at a normal temperature was introduced into the catalyst at a flow rate of 2.5 $Nm^3/hr$ (space velocity at 20,000 $hr^{-1}$). When voltage was controlled such that the catalyst temperature was 250° C. and the trimethylamine oxidation removal rate was determined, it was 90%.

Example 11

At first, a composite oxide comprising Ti and Si was prepared in the following procedures.

As a Ti source, an aqueous sulfuric acid solution of titanyl sulfate of the following composition was used.

| | |
|---|---|
| $TiOSO_4$ | 250 g/l (converted as $TiO_2$) |
| Total $H_2SO_4$ | 1100 g/l |

A solution prepared by adding 280 liter of an aqueous ammonia ($NH_3$, 25%) to 400 liter of water and further adding 24 kg of Snowtex NCS-30 (silica sol manufactured by Nissan Kagaku Co., containing about 30% by weight of $SiO_2$) was previously prepared. Then, a titanium-containing aqueous solution of sulfuric acid prepared by adding 300 liter of water to 153 liter of the aqueous solution of sulfuric acid as described above for dilution was gradually dropped under stirring to form a coprecipitation gel. The thus obtained $TiO_2$—$SiO_2$ gel was filtered, washed with water and then dried at 200° C. for 10 hours. Then, it was calcined at 550° C. in an air atmosphere for 6 hours. The resultant powder has a composition of $TiO_2$:$SiO_2$=4:1 (molar ratio) and a BET surface area of 185 $m^2/g$.

The resultant powder (hereinafter referred to as TS-1) was used to prepare the catalyst according to the present invention by the procedures described below.

After adding an appropriate amount of water to 10 kg of TS-1 powder, mixing them sufficiently in a kneader and then kneading them by the kneader and extrusion molding the uniform kneading product to prepare a lattice-like honeycomb having an outer shape of 50 mm height, 50 mm width and 50 mm length (0.3 mm wall thickness, 1.4 mm opening), dried at 150° C. for 5 hours and, subsequently, calcined at 300° C. for 2 hours in air to prepare a honeycomb molding product.

Subsequently, the molding product was impregnated with an aqueous solution of manganese nitrate, dried and sintered to obtain a catalyst comprising TS-1:$MnO_7$=70:30 by weight ratio as the oxide. The resultant catalyst had a specific resistivity of 137 ohm.cm.

When the CO oxidation function of the thus prepared catalyst was examined in the same manner as in Example 1.

Example 12

At first, a composite oxide comprising Ti and Zr was prepared by the following procedures.

1.93 kg of zirconium oxychloride ($ZrOCl_2.8H_2O$) was dissolved into 100 liter of water and 7.8 liter of an aqueous solution of sulfuric acid containing titanyl sulfate having the same composition as that used in Example 11 was added and mixed sufficiently. While maintaining the temperature at 30° C. and under sufficient stirring, an aqueous ammonia was gradually dropped till pH reached 7 and then stood still for 15 hours to form a coprecipitation gel. The thus obtained $TiO_2$—$ZrO_2$ gel was filtered, washed with water and then dried at 200° C. for 10 hours. Then, it was calcined at 550° C. in an air atmosphere for 6 hours. The resultant powder had a composition of $TiO_2$:$ZrO_2$=4:1 (molar ratio) and a BET surface area of 140 $m^2/g$.

Using the thus resultant powder (hereinafter referred to as TZ-1), a $MnO_2$ carrying support was prepared by the same procedures as in Example 11. The catalyst had a composition TZ-1:$MnO_2$=70:30 weight ratio as oxide and a specific resistivity of 130 ohm.cm.

When the CO oxidation function of the thus prepared catalyst was examined in the same manner as in Example 1, the CO oxidation removal rate was 90%.

Example 13

After adding an appropriate amount of water to a γ-alumina powder and sufficiently mixing them in a kneader, the mixture was sufficiently kneaded by a kneader and the uniform kneading product was extrusion molded to prepare a lattice-like honeycomb having an outer shape of 50 mm height, 50 mm width and 50 mm length (wall thickness 0.3 mm, opening 1.4 mm), dried at 150° C. for 5 hours and, subsequently, sintered at 300° C. for 2 hours in an air atmosphere into a honeycomb molding product.

Subsequently, the product was impregnated with an aqueous solution of manganese nitrate, dried and sintered to obtain a catalyst having a composition of γ-$Al_2O_3$:$MnO_2$=70:30 by weight ratio as an oxide. The resultant catalyst had a specific resistivity of 150 ohm.cm.

When the oxidation function of the thus prepared catalyst was examined in the same way as in Example 1, the CO removal rate was 89%.

Example 15

When the styrene oxidation function was examined by using the catalyst as prepared in Example 11 and under the conditions shown in Example 3, the oxidation removal rate was 92%.

Example 16

When the trimethylamine oxidation function was examined by using the catalyst as prepared in Example 11 and under the conditions shown in Example 4, the oxidation removal rate was 79%.

Example 17

When the ozone decomposing function was examined by using the catalyst as prepared in Example 11 and under the conditions shown in Example 5, 100% ozone was decomposed.

Example 18

Using the catalyst prepared in Example 11, the deodorizing decomposition function was examined under the following conditions.

125 cc of the lattice-like honeycomb catalyst obtained in Example 11 was charged into a tubular reactor made of SUS and air containing 1 ppm of triethylamine and 1 ppm of methylmercaptan was introduced at a flow rate of 2.5 Nm$^3$/hr (space velocity of 20,000 hr$^{-1}$) at a normal temperature to the catalyst. In this case, the catalyst was heated at 200° C. for 30 min once per day and trimethylamine and methylmercaptan adsorbed to the catalyst were removed by catalytic oxidation.

The deodorizing rate was measured at a time 20 days after introducing air. The results are shown in Table 1. The deodorizing rate was determined by the following equation:

$$\text{Deodorizing rate (\%)} = \left(1 - \frac{\text{Concentration at discharge side}}{\text{Concentration at introduction side}}\right) \times 100$$

TABLE 1

| Malodor components | Deodorization rate (%) |
| --- | --- |
| Trimethylamine | 95 |
| Methylmercaptan | 90 |

Example 19

The catalyst obtained in Example 11 was further impregnated with an aqueous solution of platinum nitrate, dried and calcined to prepare a catalyst also containing platinum as the catalyst ingredient. The thus prepared catalyst contained 2 g of Pt per one liter of the catalyst and had a specific resistivity of 141 ohm.cm.

The CO oxidation function of the thus prepared catalyst was examined as described below.

125 cc of the lattice-like honeycomb catalyst was charged into a tubular reactor made of SUS and air containing 1% CO at a normal temperature was introduced at a rate of 3.75 Nm$^3$/hr (space velocity at 30,000 hr$^{-1}$). When voltage was controlled such that the catalyst temperature was 180° C. and, CO oxidation removal rate was determined, it was more than 99%.

Example 20

A lattice-like honeycomb catalyst was prepared in the same procedures as in Example 19 except for using an aqueous solution of palladium nitrate instead of an aqueous solution of platinum nitrate. The resultant catalyst contained 2 g of Pd per one liter of the catalyst and had a specific resistivity of 143 ohm.cm.

When the CO oxidation function of the thus prepared catalyst was examined in the same way as in Example 19, the CO removal rate showed a high value of 99%.

Example 21

A lattice-like honeycomb catalyst was prepared in the same procedures as in Example 19 except for using an aqueous mixed solution of copper nitrate and iron nitrate instead of an aqueous solution of platinum nitrate. The resultant catalyst contained 15 g of CuO and 10 g of Fe$_2$O$_3$ per one liter of the catalyst and had a specific resistivity of 153 ohm.cm.

When the CO oxidation function of the thus prepared catalyst was examined in the same way as in Example 1, the oxidation removal rate was more than 99%.

Example 22

The catalyst obtained in Example 12 was further impregnated with an aqueous solution of platinum nitrate, dried and calcined to prepare a catalyst also containing platinum as the catalyst ingredient. The resultant catalyst had a composition, as an oxide, at a weight ratio of TZ-1:MnO$_2$=70:30, contained 2 g of Pt per one liter of the catalyst and had a specific resistivity of 160 ohm.cm.

When the CO oxidation function of the thus prepared catalyst was examined in the same way as in Example 19, the CO oxidation removal rate was more than 99%.

Example 23

The catalyst obtained in Example 14 was further impregnated with an aqueous solution of platinum nitrate, dried and calcined to prepare a catalyst also containing also platinum as the catalyst ingredient. The resultant catalyst contained 2 g of Pt per one liter of the catalyst and had a specific resistivity of 160 ohm.cm.

When the CO oxidation function of the thus prepared catalyst was examined in the same way as in Example 19, the CO oxidation removal rate was more than 99%.

Example 24

Using the catalyst prepared in Example 19, the trimethylamine oxidation function was examined under the following conditions.

125 cc of the lattice-like honeycomb catalyst obtained in Example 19 was charged into a tubular reactor made of SUS and air containing 50 ppm of triethylamine at a normal temperature was introduced into the catalyst at a flow rate of 2.5 Nm$^3$/hr (space velocity at 20,000 hr$^{-1}$). When voltage was controlled so that the catalyst temperature was 250° C. and the triethylamine oxidation removal rate was determined, it was 98%.

Example 25

Using the catalyst prepared in Example 19, when the deodorizing decomposing function was examined under the conditions shown in Example 18, the same results as those in Example 18 were obtained.

Example 26

A oxidation catalyst for carbon monoxide was prepared by using the TS-1 powder obtained in Example 11 with the procedures as described below.

After adding an appropriate amount of water to a mixed powder of 8 kg of the TS-1 powder and 1 kg of a graphite powder and sufficiently mixing them in a kneader, they were sufficiently kneaded in the kneader and a uniform kneading product was extrusion molded to prepare a lattice-like honeycomb having an outer shape of 50 mm height, 50 mm width and 50 mm length (wall thickness 0.3 mm, opening 1.4 mm), dried at 150° C. for 5 hours and, subsequently, calcined at 300° C. for 2 hours in an air atmosphere to form a honeycomb molding product.

Subsequently, it was impregnated with an aqueous solution of platinum nitrate, dried and then sintered to obtain a catalyst comprising TS-1:graphite:Pt=88:11:1 by weight ratio. The specific resistivity of the resultant catalyst was 58 ohm.cm.

When the CO oxidation function of the thus prepared catalyst was examined in the same way as in Example 19, the CO oxidation removal rate was more than 99%.

Example 27

The deodorizing function was examined using the catalyst prepared in Example 26, under the following conditions.

125 cc of a lattice-like honeycomb catalyst was charged into a tubular reactor made of SUS and air containing 5 ppm of trimethylamine and 5 ppm of methylmercaptan at a normal temperature was introduced at a flow rate of 2.5 $Nm^3/hr$ (space velocity at 20,000 $hr^{-1}$) was introduced to the catalyst. When the voltage and the current were controlled such that the catalyst temperature was 250° C. and the deodorizing rate after 500 hours was determined. The results are shown in Table 2.

TABLE 2

| Malodor component | Deodorization rate (%) |
|---|---|
| Trimethylamine | 98 |
| Methylmercaptan | 98 |

Example 28

The deodorizing function was examined by using the catalyst prepared in Example 26 and under the conditions shown in Example 18.

The deodorizing rate was measured 60 days after introducing air. The results are shown in Table 3.

TABLE 3

| Malodor component | Deodorization rate (%) |
|---|---|
| Trimethylamine | 96 |
| Methylmercaptan | 94 |

Example 29

An ozone decomposing catalyst was prepared by using the honeycomb molding product obtained in Example 26 and with the procedures as described below.

The honeycomb molding product was impregnated with an aqueous solution of manganese nitrate, dried and then calcined to obtain a catalyst having a composition by weight ratio, as an oxide, of TS-1:graphite:$MnO_2$=80:10:10. The resultant catalyst had a specific resistivity of 43 ohm.cm.

The ozone decomposing function of the thus prepared catalyst was examined as below.

125 cc of the lattice-like honeycomb catalyst was charged into a tubular reactor made of SUS and an air containing 5000 ppm of ozone was introduced at a normal temperature at a flow rate of 1.25 $Nm^3/hr$ (space velocity at 10,000 $hr^{-1}$) to the catalyst. When the voltage and the current were controlled such that the catalyst temperature was 80° C. and the ozone decomposing rate was determined after 3000 hours, 100% ozone was decomposed.

Example 30

The ozone decomposing function was examined by using the catalyst prepared in Example 29 under the following conditions, 125 cc of the lattice-like honeycomb catalyst obtained in Example 4 was charged into a tubular reactor made of SUS and a steam saturated air containing 5000 ppm of ozone was introduced at a normal temperature into the catalyst at a flow rate of 0.25 $Nm^3/hr$ (space velocity at 2,000 $hr^{-1}$). In this case, the catalyst was heated at 110° C. for 30 min, at a rate of once per day to conduct catalyst regeneration without stopping the ozone decomposition.

The ozone decomposing rate was measured just before the heating by electric current at 120 day after introducing air. As a result, a high decomposing rate of 99.9% was shown.

Example 31

A deodorizing test was conducted by using a device in which a catalyst, an adsorbent and a catalyst were successively arranged in the direction of a gas flow. As the adsorbent, 120 ml of a honeycomb molding product comprising $TiO_2$—$SiO_2$ composite oxide was used, and two current supply heating catalysts each of 125 ml prepared in Example 26 were used as the catalyst. The adsorbent was prepared as described below and the deodorizing test was conducted in accordance with the following procedures.

(Preparation of Adsorbent)

An appropriate amount of water was added to 10 kg of the TS-1 powder, mixed thoroughly in a kneader and then sufficiently kneaded in the kneader, and the uniform kneading product was molded in an extrusion molding machine into a lattice-like honeycomb having an outer shape of 50 mm height, 50 mm width and 50 mm length (wall thickness 0.3 mm, opening 1.4 mm), which was dried at 150° C. for 5 hours and then calcined at 300° C. in 2 hours in an air atmosphere to obtain an adsorbent.

(Deodorizing Test)

Malodor gas discharged from a purification tank was sucked at a flow rate of 1.25 $m^3/hr$ into the device at a normal temperature for 2 hours. Then, the operation of the blower was interrupted to reduce the flow rate to zero. Then, the catalyst was heated by electric current supply to elevate the temperature of the catalyst upto 300° C. and maintained as it was for 20 min. Subsequently, the electric current supply was interrupted and the blower was started to recover the flow rate to 1.25 $m^3/hr$ and the gas was attracted at a normal temperature.

Odor at the exit gas was examined after 10 cycles each cycle including the foregoing procedures. The intensity of the odor was examined by a functional test using means sense of smell and then indicated by six stage smell intensity indication.

The results are shown in Table 4. The Table 4 also shows, as a comparative example. a results of adsorbing the malodor gas discharged from the purification tank at a flow rate of 1.25 m³hr, without heating the catalyst by electric current supply at a normal temperature in the device.

TABLE 4

| Inlet gas | 5 | Original odor |
|---|---|---|
| Exit gas (after 10 cycles, about 25 hr) | 0–1 | Example 31 |
| Exit gas (after 8 hours) | 4 | Comp. Example |

0: no-odor
1: just sensible odor
2: odor recognizable for the source
3: easily sensible odor
4: intense odor
5: keen odor As apparent from Table 4, high deodorizing efficiency can be obtained stably for a long period of time by the method according to the present invention. On the contrary, odor was gradually sensed after seven hours and intense odor was recognized after 8 hours in Comparative Example.

Example 32

The adsorption-burning decomposition according to the present invention was practiced by using the catalyst prepared in Example 29 and by the following procedures and the effects were confirmed.

125 cc of the lattice-like honeycomb catalyst was charged in a tubular reactor made of SUS and air containing 1 ppm of trimethylamine was introduced at a normal temperature at a flow rate of 2.5 Nm³/hr (space velocity at 20,000 hr$^{-1}$) from the below the catalyst and, after three hours flowing, introduction of air was interrupted and the catalyst was heated to 250° C. for 30 min to decompose trimethylamine adsorbed to the catalyst by oxidizing combustion.

Desorption and scattering of trimethylamine upon heating under an elevated temperature after introduction of air were examined by the functional test shown in Example 31. The results are shown in Table 5. Table 5 also shows, as a Comparative Example, for the results of using the same catalyst and introducing air from above (other conditions being identical). As can be seen from Table 5, the highest decomposing rate is shown in the case of practicing the present invention.

TABLE 5

|  | 6-stage odor intensity |
|---|---|
| Example | 0–1 |
| Comparative Example | 3 |

What is claimed is:

1. A method of decomposing ozone, which comprises the steps of:

contacting an ozone-containing gas with a catalyst of (a) $MnO_2$ or (b) $MnO_2$ combined with at least one element selected from the group consisting of Fe, Co, Ni, Cu, Ag, Au, Pt, Pd and Rh, either of which catalysts (a) or (b) is supported on an inorganic support, said catalyst being integrally molded and being directly heated by an applied electric current; and decomposing the ozone in said gas.

2. The method as defined in claim 1, wherein the temperature of the directly heated catalyst by said applied electric current is from 50° to 400° C.

3. The method as defined in claim 1, wherein the direct heating for the catalyst by applied electric current is conducted intermittently.

4. The method as defined in claim 3, wherein the temperature of the directly heated catalyst by said applied electric current is from 50° to 400° C.

5. The method of claim 1, wherein the inorganic support is at least one of a binary composite oxide of Ti and Si, a binary composite oxide of Ti and Zr or a ternary composite oxide of Ti, Si and Zr.

6. A method of decomposing absorbable gas components of a gas by absorption-combustion, comprising the steps of:

(a) flowing a gas containing absorbable gas components over
   (1) a first catalyst,
   (2) an absorbent, and
   (3) a second catalyst, in sequential order, said first and second catalyst being integrally molded $MnO_2$ or integrally $MnO_2$ combined with at least one element selected from the group consisting of Fe, Co, Ni, Cu, Ag, Au, Pt, Pd and Rh, thereby sorbing absorbable gas components from the gas;

(b) directly heating the first and second catalyst and absorbent by applying an electric current to the first and second catalyst thereby desorbing absorbable gas components and bringing the desorbed gas components in contact with the first and second catalyst and decomposing the gas components; and (c) interrupting the heating of the first and second catalyst after all of said gas components have been decomposed by combustion and returning to step (a).

7. The method of claim 5, wherein said inorganic support is at least one of a binary composite oxide of Ti and Si, a binary composite oxide of Ti and Zr or a ternary composite oxide of Ti, Si and Zr.

8. A method of decomposing absorbable gas components of a gas on a catalyst-sorbent, comprising the steps of:

flowing said gas containing absorbable gas components in an upward direction through an integrally molded $MnO_2$ on a support or a catalyst-sorbent or integrally molded $MnO_2$ with at least one element selected from the group consisting of Fe, Co, Ni, Cu, Ag, Au, Pt, Pd and Rh, on an inorganic support, thereby absorbing said absorbable gas components;

desorbing the absorbed gas components by heating, which desorption is accompanied by reduction of the flow of gas through the catalyst; and decomposing the absorbed gas components by directly heating the catalyst by applied electric current until all desorbed gas components are decomposed thereby discharging gas to the environment free of unburnt gas components.

9. The method of claim 8, wherein said inorganic support is at least one of a binary composite oxide of Ti and Si, a binary composite oxide of Ti and Zr or a ternary composite oxide of Ti, Si, and Zr.

10. The method of claim 5, wherein said catalyst is supported on an inorganic support.

* * * * *

UNITED STATES PATENT AND TRADEMARK OFFICE
CERTIFICATE OF CORRECTION

PATENT NO. : 5,472,676
DATED : December 5, 1995
INVENTOR(S) : Sadao Terui, et. al.

It is certified that error appears in the above-indentified patent and that said Letters Patent is hereby corrected as shown below:

Title page, item [54] and col. 1, line 2, the title should read -- METHOD OF DEODORIZING A GAS CONTAINING MALODOROUS COMPONENTS--.

Signed and Sealed this

Fourth Day of June, 1996

Attest:

BRUCE LEHMAN

*Attesting Officer*          *Commissioner of Patents and Trademarks*